Aug. 29, 1967  FUMIYUKI INOSE  3,339,121
PROGRAM CONTROLLER

Filed Nov. 10, 1964

INVENTOR.
Fumiyuki Inose

BY

Weslem & Weslem

INVENTOR.
Fumiyuki Inose

BY

Western & Western

United States Patent Office 3,339,121
Patented Aug. 29, 1967

3,339,121
PROGRAM CONTROLLER
Fumiyuki Inose, Hachioji-shi, Japan, assignor to Kabushiki Kaisha Hitachi Seisakusho, Tokyo-to, Japan, a joint-stock company of Japan
Filed Nov. 10, 1964, Ser. No. 410,086
Claims priority, application Japan, Nov. 12, 1963, 38/60,376
1 Claim. (Cl. 317—157)

ABSTRACT OF THE DISCLOSURE

A program controller having a program generator which causes a program sheet having an electric conductive part and an electric insulating part corresponding to program curves to travel through a gap between a first coil fitted with a needle-pointer of a moving-coil type measuring instrument and a second coil fixedly disposed to oppose the first coil within a movable range of the needle-pointer, and simultaneously, causes the first coil to trace the program on the program sheet, whereby an output signal corresponding to the program is generated.

---

This invention relates to so-called program control wherein a variable to be controlled such as, for example, the temperature of a furnace, is controlled in accordance with a definite program. More particularly, the invention concerns a new program controller having highly desirable features for accomplishing such program control.

It is a prime object of the present invention to provide a program controller of an inseparably integral arrangement of a program generator and controller, in contrast to the conventional arrangement of separately provided program generator and controller, whereby the entire arrangement is rendered extremely simple and of miniature size with resulting reduction in cost.

It is another object to provide a program controller of the above stated character in which certain disadvantages of conventional controllers, as will be described hereinafter more fully, are eliminated.

Briefly stated, the present invention resides in a program controller wherein a program sheet having one part thereof formed of an electrical conductor and another part thereof formed of an electrical insulator, the relative configurations of which parts define a program curve, is caused to travel through a gap between a first coil and a second coil, the first coil being secured to a movable member to be movable therewith, which movable member is caused to undergo displacement in accordance with detection signals transmitted from a sensor detecting the quantity of a variable to be controlled of a control object, and the second coil being adapted to confront constantly the first coil with said gap therebetween; and an electrical quantity induced in one of said coils from the other coil in response to the character, conductive or insulative, of the part of the program sheet traveling through said gap is detected and utilized to control the controlled variable.

The nature, principle, and details of the invention will be more clearly apparent by reference to the following description taken in conjunction with the accompanying drawings in which like parts are designated by like reference numerals, and in which.

Figure 2:
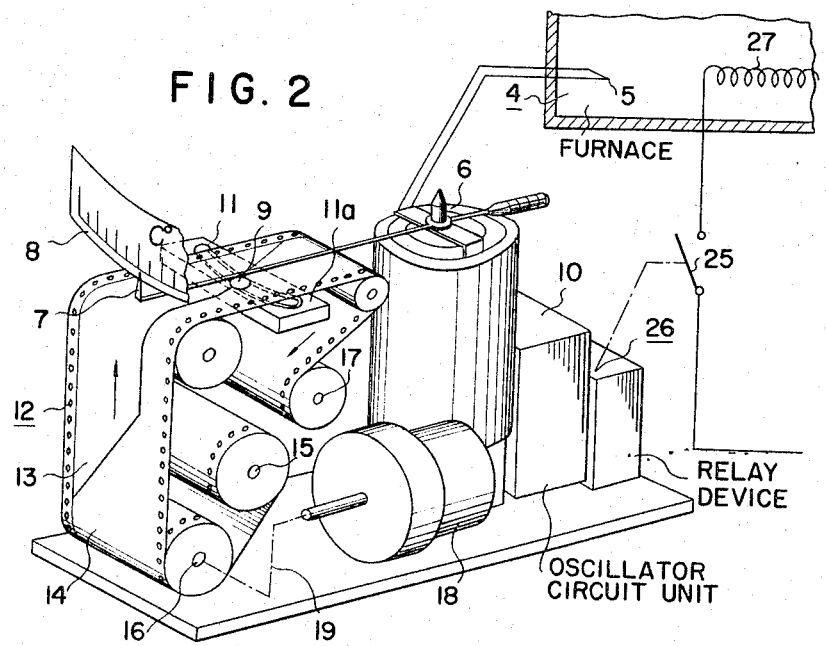
FIG. 2 is a diagrammatic, perspective view showing the essential parts of a preferred embodiment of the program controller according to the invention.
Figure 3A:
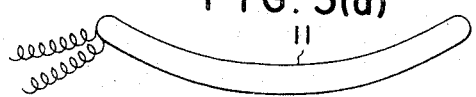
Figure 3B:
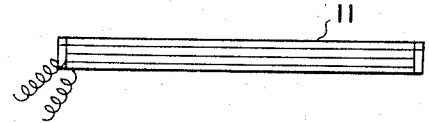
Figure 4:
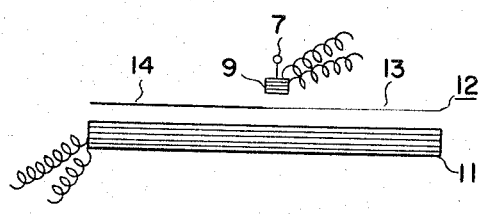
Figure 5:
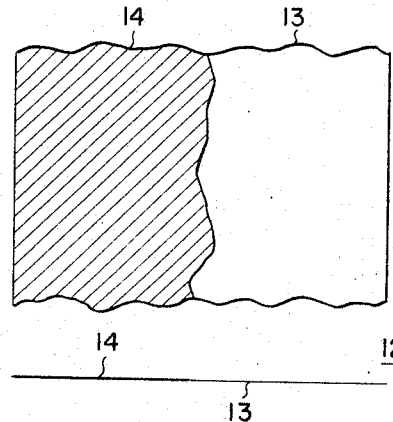
Figure 6:
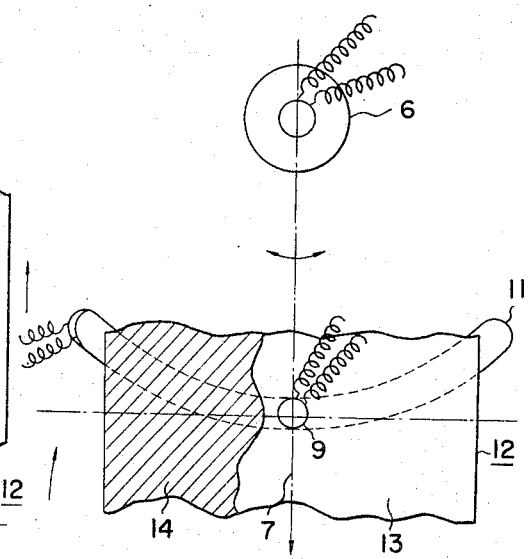
Figure 7:
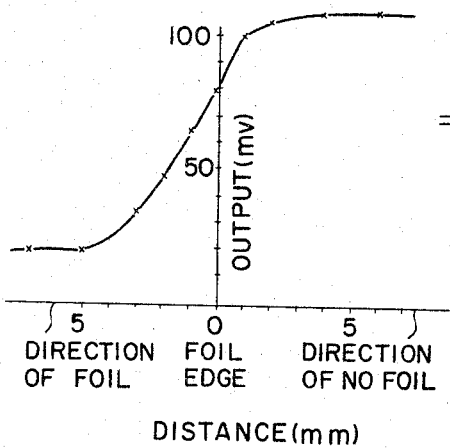
Figure 8:
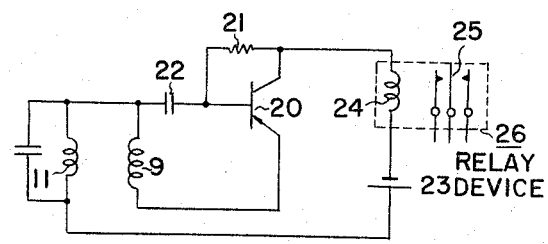

FIGS. 3(a) and 3(b) are respectively plan and elevational views showing a stationary coil suitable for use in the controller shown in FIG. 2;

FIG. 4 is an elevational view diagrammatically indicating the mechanism of comparison between a measured value and a set value according to the invention;

FIG. 5 shows a fragmentary, planar view and an end view of a program sheet for use in the controller of the invention;

FIG. 6 is a fragmentary, diagrammatic view, indicating the operation of essential parts of the program controller of the invention;

FIG. 7 is a graphical representation indicating a characteristic of the section for generating on-off signals of the program controller of the invention; and FIG. 8 is a circuit diagram of an oscillator suitable for use in the controller according to the invention.

Figure 1:
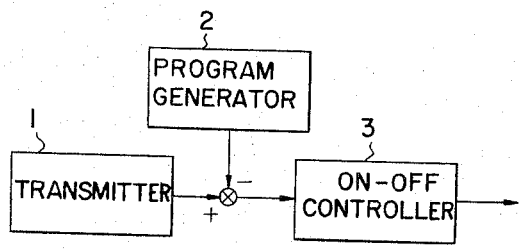
FIG. 1 is a block diagram showing the essential components of an example of a conventional program controller.

Program controlling apparatuses of known type have had arrangements as exemplified in FIG. 1, in which reference numeral 1 indicates a transmitter, at whose detector the controlled variable of a control object (not shown) is detected.

For example, in the case where the temperature of a furnace is to be controlled, the temperature is converted by a sensor such as a thermocouple into an electrical signal, which, after being amplified, is compared with the output of a program generator 2. The voltage difference of the two outputs is applied to an on-off controller 3, the output of which becomes either an "on" or "off" signal in response to the polarity of the voltage difference so applied. This "on" or "off" signal is then applied to an actuator (not shown) for causing variation in the controlled variable of the control object.

A conventional apparatus of the above description has certain disadvantages. For example, even the program generator alone, requiring the application of parts such as servomechanisms, is of complicated construction and high price. Moreover, since special techniques are used in the program setting of the program generator and also in the sensing section, it is difficult to change programs.

Furthermore, there are various kinds of on-off controllers such as, for example, the moving coil, loop drop type and the self-balancing type, and apparently no thought has heretofore been given to technique other than program controlling by providing separately a program generator and an on-off controller of completely different principles. Accordingly, the entire apparatus has unavoidably tended to become complicated and expensive and, moreover, to become large in bulk requiring much installation space.

The present invention contemplates the provision of a new program controller of integral arrangement and construction wherein the above described disadvantages are eliminated as briefly mentioned hereinbefore and as will now be described in detail with respect to a preferred embodiment of the invention.

Referring to FIG. 2 showing, in a schematic manner, the essential arrangement and construction of the embodiment of the invention, the temperature of a furnace 4, which is the control object, is detected or sensed by a thermocouple 5. The output of this thermocouple 5 is applied to a moving-coil type measuring instrument 6 to cause an indicating pointer 7 thereof to move in response to the magnitude of the output. The indication of the pointer 7 is read on a scale 8 calibrated in units of temperature.

To one part of the pointer 7, there is fixed a moving coil 9, which moves laterally along an arcuate path together with the pointer 7. This moving coil 9, as described hereinafter, constitutes a part of an oscillator, the electrical circuit of which is contained in a circuit unit 10. A stationary coil 11 is disposed in a position to confront the moving coil 9 moving together with the pointer 7, a suitable gap being provided between the two coils. The stationary coil 11, which is fixed to a support plate 11a, has a shape as indicated in FIG. 3.

FIG. 3(a) shows the upper surface and FIG. 3(b) shows a side sectional view of the stationary coil 11. As indicated in FIG. 3(a), the coil 11 is curved in a configuration conforming to the path of motion of the moving coil 9. The gap between the path of the moving coil 9 and the stationary coil 11 is so provided that a program sheet 12 can travel therethrough as indicated in FIG. 4.

The program sheet 12 consists essentially of an insulator 13 such as paper on which a metal foil 14 is bonded as shown in FIG. 5, the shape of the inner edge of the foil 14 conforming to the predetermined program curve. The program sheet 12 is caused to travel, by means described more fully hereinafter, in definite direction, the relationship of which with respect to direction of motion of the pointer 7 is shown in FIG. 6.

Referring to FIG. 6, the pointer 7 moves rotatably about its pivotal support point in accordance with the direction and magnitude of the current entering the winding of a driving coil 6′ of the aforementioned moving-coil type measuring instrument 6. The program sheet 12 is caused to travel through the gap between the moving coil 9 and the stationary coil 11 in the direction opposite to that in which the pointer 7 is directed when the above said input current is one-half of its full-scale value, that is, when the pointer 7 is in a position such that it exactly bisects the arc of the stationary coil 11. The program sheet 12 is so caused to travel by a mechanism as illustrated in a simplified manner in FIG. 2.

Referring again to FIG. 2, this mechanism comprises essentially reels 15, 16, and 17, other guide reels as necessary, a synchronous motor 18, and a suitable speed reduction mechanism 19 through which power is transmitted from the motor 18 to drive the reel 16. The program sheet 12, which is initially wound around the reel 15, is thereby caused to travel through the gap between the coils 9 and 11 and, thereafter to be wound up on the reel 17.

In the instant embodiment of the invention, the above mentioned moving coil 9 and the stationary coil 11 constitute coupling coils of the oscillator contained in the circuit unit 10, and the coupling state thereof is varied by the movement of the program sheet on which the metal foil 14 is bonded, whereby the oscillator is caused to oscillate or stop oscillating. The resulting variation in the output current of the oscillator is utilized to activate a relay device 26 in on-off operation.

A specific example of an oscillation circuit for the above mentioned oscillator is shown in FIG. 8, in which there is provided a pnp-type transistor 20. The above mentioned moving coil 9 fixed to the pointer 7 is inserted between the base and emitter of this transistor 20, while the stationary coil 11 of arcuate shape fixed to the support plate 11a is inserted between the base and collector of said transistor 20. A resistance 21 and a capacitor 22 are connected as shown to form a self bias. Power is supplied from a power supply 23 connected in series with a relay coil 24 inserted in the output circuit of the transistor 20 and with the stationary coil 11.

The relay coil 24 and a relay contact device 25 which operates in response to the current flowing through the relay coil 24 constitutes a relay device 26, which opens or closes the power supply circuit of an electric heater 27 supplying thermal energy to the control object 4, as indicated in FIG. 2, thereby to control the temperature within the control object 4 in accordance with the program on the program sheet 12, as will be described more fully hereinbelow.

In the operation of the program controller of the above described example arrangement according to the invention, the temperature within the control object 4 is detected by the thermocouple 5, and the detection output produced thereby is applied to the moving-coil type measuring instrument 6. Accordingly, the pointer 7 of this instrument 6 is rotationally displaced by a definite angle in response ot the magnitude of this output to a certain angular position.

If, at this position, the portion of the program sheet 12 passing at the time through the gap between the moving coil 9 and the stationary coil 11 is covered with the metal foil 14, the oscillation of the oscillation circuit unit 10 will stop, and a considerably large current will flow through the relay coil 24, whereby the relay device 26 will be activated to assume the "on" state, for example.

Conversely, if the part of the program sheet 12 passing at the time through the gap between the coils 9 and 11 is the insulator 13, the oscillation circuit unit 10 will continue oscillating, and only a very low current will flow through the relay coil 24, whereby the relay device 26 will assume the "off" state, for example.

In the above described operation, the current flowing through the relay coil 24 is approximately 0.1 ma. when the oscillation is continued and is of the order of 50 ma. when the oscillation is stopped. In this manner, it is possible to control the temperature of the control object 4 with an accuracy of approximately 1 percent in accordance with a preset program.

In a conventional apparatus, control of this kind is accomplished, as mentioned hereinbefore, by comparing an electrical signal generated according to a program with an electrical signal generated in response to a controlled variable of the control object. In contrast, in the program controller of the present invention, an electrical signal is not generated in accordance with a program, but, instead, a set value and the controlled variable are compared directly by means of the coils 9 and 11 and the program sheet 12. For this reason, the entire controller can be remarkably simplified, miniaturized, lightened, and, moreover, made inexpensive.

As described above, the present invention provides a program controller in which the functions of a program generator and an on-off controller are incorporated and made accomplishable simultaneously in a single unit of apparatus, whereby it is possible to miniaturize and simplify the entire apparatus and, at the same time, to obtain positive and reliable operation.

In the above described example, the coils 9 and 11 are used as coupling coils of an oscillator, the coupling state of said coils is caused by a program sheet to vary, and the oscillation and inoperative state of the oscillator is utilized to obtain on-off signals. Alternatively, on-off control is possible also by causing a current of suitable frequency to flow through the stationary coil 11 and causing the relay device 26 to operate in response to the resulting voltage generated in the moving coil.

More specifically, if in this case the part of the program sheet 12 passing between the coils 9 and 11 is covered with the metal foil 14, the voltage generated in the coil 9 will be low, and if said part is the insulator 13 without the metal foil 14, the generated voltage will be high. The result of actual measurement of this voltage generates in the coil 9 with respect to the distance of the part of the program sheet 12 lying between the two coils from the edge (program curve) of the metal foil is indicated graphically in FIG. 7, in which the abscissa is the output voltage, and the ordinate is said distance. The above mentioned measured result was obtained with a voltage of 100 kc./s., 2 v., rms.

As is apparent from the graph of FIG. 7, the voltage generated in the coil 9 when it is displaced to a position at a distance of 5 mm. from the edge of the metal foil indicating the program curve in the direction of the region covered by the foil is of the order of 20 mv., while the voltage generated in the coil 9 when it is displaced to a position at a distance of 5 mm. from said edge in the direction of no foil becomes more than 100 mv. Therefore, this voltage difference is ample for activating the relay device 26 to perform on-off operation.

Furthermore, it is possible to provide the program controller of the present invention with a suitable protector. For example, excessive swinging of the pointer of the moving-coil type instrument outside of its normal range of movement and resulting damage due to external shock or vibration or excessively large input can be effectively prevented by additionally providing a limiter to limit the movement of this pointer so as to be confined within said normal range.

Accordingly, it should be understood that foregoing disclosure relates to only a preferred embodiment of the invention and that it is intended to cover all changes and modifications of the example of the invention herein chosen for the purposes of the disclosure, which do not constitute departures from the spirit and scope of the intion as set forth in the appended claim.

What I claim is:

A program controlled comprising in combination: means for detecting a quantity of a control object to be controlled; a moving-coil type measuring instrument, to which a detection signal of said detecting means is impressed as an input; a first coil fitted to a pointer of said instrument; a second coil disposed in opposite position to said first coil at an appropriate interval within movable range of said pointer; a program sheet travelling through a gap between said first and second coils, said sheet having one part consisting of an electrical conductor and another part consisting of an electrical insulator of relative configurations corresponding to program curves; an on-off controller to generate on-off output in accordance with whether the part of said program sheet existing in the gap between said first and second coils is an electrical conductor or an electrical insulator; and means to control said quantity by the output of said on-off controller.

References Cited

UNITED STATES PATENTS

| | | | |
|---|---|---|---|
| 2,679,620 | 5/1954 | Berry | 318—20.150 |
| 2,889,496 | 6/1959 | Moore | 317—146 |
| 2,907,931 | 10/1959 | Moore | 317—146 X |
| 2,912,052 | 11/1959 | Maltby | 317—146 X |
| 3,012,730 | 12/1961 | Coogan | 317—146 X |
| 3,207,964 | 9/1965 | Woods et al. | 318—20.150 |

MILTON O. HIRSHFIELD, *Primary Examiner.*

J. A. SILVERMAN, *Assistant Examiner.*